(12) United States Patent
Mistry et al.

(10) Patent No.: US 9,023,918 B1
(45) Date of Patent: May 5, 2015

(54) BIODEGRADABLE PLASTIC RESIN

(75) Inventors: Gary Mistry, Sugar Land, TX (US); Madrisano Catinari, Marche (IT)

(73) Assignee: Green Dot Holdings LLC, Cottonwood Falls, KS (US)

( * ) Notice: Subject to any disclaimer, the term of this patent is extended or adjusted under 35 U.S.C. 154(b) by 25 days.

(21) Appl. No.: 13/549,052

(22) Filed: Jul. 13, 2012
(Under 37 CFR 1.47)

Related U.S. Application Data

(60) Provisional application No. 61/540,316, filed on Sep. 28, 2011.

(51) Int. Cl.
*C08L 3/00* (2006.01)
*C08L 3/02* (2006.01)

(52) U.S. Cl.
CPC ........................................ *C08L 3/02* (2013.01)

(58) Field of Classification Search
USPC ............................................................ 524/47
See application file for complete search history.

(56) References Cited

U.S. PATENT DOCUMENTS

| | | | |
|---|---|---|---|
| 5,412,005 A | | 5/1995 | Bastioli et al. |
| 5,922,379 A | * | 7/1999 | Wang ............................ 426/138 |
| 6,605,657 B1 | | 8/2003 | Favis et al. |
| 8,067,485 B2 | | 11/2011 | Changping |
| 8,232,348 B2 | | 7/2012 | Chanping |
| 2011/0152815 A1 | * | 6/2011 | Wang et al. ............... 604/385.01 |
| 2011/0196071 A1 | | 8/2011 | Mentink et al. |
| 2012/0150137 A1 | * | 6/2012 | Wang et al. ............... 604/385.29 |

FOREIGN PATENT DOCUMENTS

WO WO 2010043814 A1 * 4/2010

OTHER PUBLICATIONS

Zygoura, P. D., et al., "Migration of di-(2-ethylhexyl)adipate and acetyltributyl citrate plasticizers from food-grade PVC film into isooctane: Effect of gamma radiation," J. Food Eng., 2007, 78, 870-877.*

* cited by examiner

*Primary Examiner* — Mark Eashoo
*Assistant Examiner* — Nicholas Hill
(74) *Attorney, Agent, or Firm* — Hovey Williams LLP

(57) ABSTRACT

Biodegradable resin materials are provided which comprise a blend of a starch component, a synthetic thermoplastic polymer resin, one or more plasticizers, and a protein component. In certain embodiments, the synthetic thermoplastic polymer resin may comprise a thermoplastic polyester-based compound, and the protein component may comprise albumin. The biodegradable resin materials tend to exhibit physical and mechanical characteristics that contrast with conventional biodegradable materials.

22 Claims, No Drawings

BIODEGRADABLE PLASTIC RESIN

BACKGROUND OF THE INVENTION

1. Field of the Invention

The present invention is generally directed toward biodegradable resin materials that have exhibit elastic properties that are uncharacteristic of many conventional biodegradable plastic materials. Particularly, the resin materials comprise a mixture of a starch component, a synthetic thermoplastic polymer resin, namely thermoplastic polyurethane, one or more plasticizing compounds, and a protein component, namely albumin.

2. Description of the Prior Art

The blending of starch with synthetic polymers in order to create polymeric resin compositions has been previously documented. Starch, an inexpensive filler material, has been blended with more expensive synthetic polymers, especially polyolefins, in order to reduce manufacturing costs and also to impart partial biodegradability to the resulting blend. U.S. Pat. Nos. 6,605,657 and 5,412,005 are exemplary of the art in this area.

However, the presence of starch has often had a negative impact on the physical and mechanical properties of the resulting mixture. For example, obtaining a finished article that sufficiently disintegrates and biodegrades, in that a sufficient portion of its carbon content is converted into $CO_2$ under certain conditions, has proved elusive. Further, conventional biodegradable polymeric resins can be quite hard and brittle, and thus do not lend themselves to applications where a certain level of softness and elasticity are required.

SUMMARY OF THE INVENTION

The present invention overcomes a number of the difficulties with the prior art, and according to one embodiment, provides a polymeric resin material comprising a starch component, a plasticizer, a synthetic thermoplastic polymer resin, and a protein. In particular embodiments, the synthetic thermoplastic polymer resin is a polyester-based resin comprising one or more members selected from the group consisting of polyester polyurethane (TPU) resins, polyester polyamide (COPA) resins, and polyether polyester (COPE) resins. In certain embodiments, the protein comprises a water-soluble protein such as albumin. The polymeric resin material also tends to exhibit physical characteristics different from other biodegradable resins. For example, the polymeric resin materials according to embodiments of the present invention tend to be much more elastic and exhibit a higher elongation capability than other resin materials.

According to other embodiments of the present invention, articles of manufacture made with the polymeric resin materials according to the invention. The polymeric resin materials generally exhibit processing characteristics that are amenable to a wide variety of applications. Particularly, the resin materials are highly suitable for use in molding processes, such as injection, blow, compression, and thermoformed molding processes. The resin materials may also be extruded into sheets, profiles, films, coatings or combined with foaming agents to produce biodegradable foam products. The resin material may be suitable for use as a hot melt adhesive using a conventional heated glue gun.

DETAILED DESCRIPTION OF THE PREFERRED EMBODIMENT

The polymeric resin material according to certain embodiments of the present invention is a biodegradable resin material comprising a starch component, a synthetic polymeric resin, a plasticizer and a protein. The resin material is formulated to provide improved hardness and elastic characteristics as compared to other conventional biodegradable resin materials. Particularly, certain resin materials of the present invention are capable of achieving these characteristics without the use of polyolefin components.

The starch component may comprise a starch obtained from plant sources, such as cereal plants (e.g., corn, wheat, rice, barley, triticale and sorghum), tubers (e.g., potato and cassava), legumes (e.g., peas, soybeans, and beans), or derived from other non-food cellulosic materials and biomass. The starch component may comprise entirely raw or unmodified starch, or it can be starch that has been mixed, modified, or complexed with other materials to improve the mechanical properties thereof. Thus the starch component may further comprise natural or synthetic polymers, especially biodegradable polymers obtained from both renewable raw materials and fossil raw materials. The modifying or complexing polymers may be plasticizers, such as polyols and polyol derivatives, esters, ester-modified thermoplastic cellulosic polymers, urethane pre-polymers, di-acids, or other compounds which can impart desired characteristics to the starch component. In other embodiments, the modifying or complexing polymers may comprise polycaprolactones (PCLs), aromatic copolyesters (PBATs), aliphatic polyesters (PBSs), water-soluble polymers such as polyvinyl alcohol (PVOH), or polyesters of renewable origin such as polylactates (PLAs), microbial polyhydroxyalkanoates (PHAs) or cellulose derivatives. In still other embodiments, the starch component comprises a starch ester having a degree of substitution (DS) of between 1.0 to 3.0, between 1.8 and 2.9, or between 2.2 and 2.8. One particularly preferred starch component is Mater-Bi® available from Novamont, Milan, Italy. In certain embodiments, the starch component comprises between about 20% to about 60% by weight, between about 30% to about 50% by weight, or between about 35% to about 45% by weight of the overall resin material. Other exemplary starch components suitable for use with the present invention include those recited in U.S. Patent Application Publication No. 2011/0196071, incorporated by reference herein in its entirety.

The thermoplastic resin is an elastomeric synthetic polymeric resin that tends to soften when heated and solidified when cooled. In certain embodiments, the thermoplastic resin comprises one or more members selected from the group consisting of thermoplastic polyurethane resins (TPU), copolyester elastomers such as polyether polyester (COPE) resins and polyether polyamide (COPA) resins, and combinations thereof. In particular embodiments, it is preferable for the thermoplastic resin component to include TPU alone or in combination with at least one of COPA and COPE. The TPU is formed by reacting polyols (long-chain diols) with disocyantes and short-chain diols. The polyols and the short-chain diols react with the diisocyanates through polyaddition to form linear polyurethane. Flexible segments are created by the reaction of the polyol with the diisocyanate. The combination of diisocyanate with short-chain diol produces the rigid component (rigid segment). Exemplary TPU resins include the Ellastolan® family available from BASF. In certain embodiments, the TPU may be pre-mixed with a softening agent or plasticizer. In alternate embodiments, the TPU may be provided separate from the plasticizer component. The TPU resin may be present in the resin material at a level of between about 20% to about 40% by weight, between about 22% to about 35% by weight, or between about 25% to about 32% by weight.

The plasticizer component may be any suitable material known to improve the softness of a polymeric resin material. Exemplary plasticizers include various poloyls, ethers, thioethers, inorganic and organic esters, acetals, and derivatives thereof. However, in certain embodiments, it may be preferable for the resin material to be free of certain polyols, such as glycerol. Particularly preferred plasticizers include organic acid-derived plasticizers, especially organic acid ester plasticizers. Exemplary organic acid-derived plasticizers include citric acid-derived plasticizers, such as a citric acid ester plasticizer, adipic acid derivatives such as tridecyl adipate, and benzoic acid derivatives such as isodecyl benzoate. One commercially available citric acid ester plasticizer is Citrofol® BII, available from Jungbunzlauer, Basel, Switzerland, also known as acetyltributyl citrate. As noted above, the plasticizer component may be supplied premixed with the TPU or it may be added as a separate component. In certain embodiments, the plasticizer is present in the resin material at a level of between about 20% to about 40% by weight, between about 22% to about 35% by weight, or between about 25% to about 32% by weight.

In certain embodiments, the protein component of the resin material is a water-soluble protein, particularly those that are heat-denaturable. As used herein, the term "water soluble protein" refers to natural or modified proteins that have solubility in water of at least 1 mg/mL at 25° C., and more preferably at least 10 mg/mL at 25° C. In particular embodiments, the water-soluble protein is not glycosylated, that is, does not contain sugar chains. The water-soluble protein may be albumin. The albumin may be derived from any source including eggs and bovine serum. In certain embodiments, the protein is present in the resin material at a level of between about 0.1% to about 10% by weight, between about 0.5% to about 5% by weight, or between about 1% to about 3% by weight.

The resin material may include a number of optional components such as coloring agents, flavoring agents, or fragrances to provide desired aesthetic qualities thereto. Also, the physical characteristics of the resin material may be adjusted by addition of crosslinking agents, release agents, and lubricants. If present, these components each generally comprise less than 10% by weight of the overall formulation, and more preferably, less than 5% by weight of the formulation.

The components of the resin material are blended together using a suitable mixing apparatus, such as a single or twin-screw extruder, under conditions sufficient to form a resin melt, typically involving the application of heat. The precise processing conditions employed in the production of the resin material may depend somewhat on the equipment employed (e.g., extruder configuration, barrel length, screw configuration, screw speed), however, generally the temperature of the material within the extruder is maintained below 335° F. so as to avoid thermal degradation of the material. In certain embodiments, the resin material is maintained at a temperature of between about 300° F. to about 329° F. during mixing and processing. The mixing process does not initiate or promote chemical reactions between the various components, although it is possible for the individual components themselves to be chemically altered, such as complete or partial denaturation of the protein component. Thus, the resulting polymeric resin material is a melt-blended resin. In certain embodiments, no water is added to the components during formation of the resin material. The resin material may then be extruded and pelletized for storage and shipping, until it is to be processed into a finished product.

The resin material may also be processed into finished products under more favorable or energy efficient conditions than many petroleum-based thermoplastic resins, such as polyethylene and polypropylene. For example, pellets of the resin material may be heated to create a resin melt. Typically, if the melt is made in an extruder, the temperature of the melt at all points in the extruder may be within the range of about 250° F. to about 330° F., or about 300° F. to about 329° F., approximately 30-50° F. below that used in the processing of petroleum-based thermoplastic resins. In certain embodiments, it is also recommended to thoroughly dry the pelletized resin material so as to ensure that the resin melt is substantially water-free.

Once formed, the melt may be processed into a finished article using a number of means. For example, the melt may be poured or forced into a mold (i.e., injection or blow molding applications), extruded into a thin film, or foamed using non-petroleum based, organic foaming agents.

In certain embodiments, polymeric resin materials according to the present invention are biodegradable. Particularly, the polymeric resin material biodegrades by at least 50% after 100 days, or by at least 60% after 120 days, of testing in accordance with DIN EN 13432 and ISO 14855.

Further, resin materials according to the invention may exhibit softer, more elastic properties than prior biodegradable resin materials. In certain embodiments, the polymeric resin materials have an ultimate tensile strength of between about 5 to about 20 MPa, between about 7 to about 15 MPa, or between about 8 to about 12 MPa when tested in accordance with ISO 37. In certain embodiments, the polymeric resin materials exhibit an elastic modulus of between about 1 to about 20 MPa, between about 2 to about 15 MPa, or between about 3 to about 8 MPa when tested in accordance with ISO 37. In certain embodiments, the polymeric resin material exhibits an elongation at break of at least 300%, at least 500% or at least 600% when tested in accordance with ISO 37. In certain embodiments, the resin material exhibits a Shore A hardness of between about 50 to about 100, between about 60 to about 95, or between about 70 to about 90 when tested according to ISO 868. In certain embodiments, the resin material exhibits a tear strength of between about 30 to about 90 N/mm, between about 40 to about 80 N/mm, or between about 45 to about 60 N/mm when tested according to ISO 34-1. In certain embodiments, the resin material exhibits a melt flow index (MFI) at 190° C./5 kg of between about 30 to about 180 g/10 min, between about 50 to about 150 g/10 min, or between about 70 to about 120 g/10 min when tested according to ISO 1133. In certain embodiments, the resin material exhibits a compression set (a measure of the ability of elastomeric materials to maintain elastic properties after prolonged compressive stress) of between about 15% to about 50%, between about 20% to about 45%, or between about 30% to about 40% when tested according to ISO 815 or ASTM D395(B) for 22 hours at 23° C.

Because resin materials according to certain embodiments of the present invention do not comprise polyolefins, such as polyethylene and polypropylene, they are amenable to having printed images placed thereon using printing processes that are difficult to use with olefin-based plastics. Typically, olefin-based plastics must undergo corona treatment prior to printing an ink image thereon because these materials typically have chemically inert, nonporous surfaces with low surface energies that cause them to be non-receptive to bonding with printing inks, coatings, and adhesives. The inherent surface energy of resin material made in accordance with the present invention is sufficiently compatible with many conventional printing methods and inks so as not to require any corona treatment prior to printing of an image thereon.

EXAMPLES

The following examples set forth exemplary compositions made in accordance with the present invention. It is to be understood, however, that these examples are provided by way of illustration and nothing therein should be taken as a limitation upon the overall scope of the invention.

Example 1

The following composition is an exemplary polymeric resin material formed in accordance with the present invention. The components are mixed together in an appropriate device, such as an extruder, and then pelletized. Alternatively, the pelletization stage can be skipped and the resin material directly utilized in a manufacturing process.

40% starch resin (Novamont Mater BI)
58.5% premixed TPU (BASF Ellastolan Soft 35 A P12)
1.5% protein (albumin)

The polymeric resin material was then tested for composting capability according to DIN EN 13432 and ISO 14855.

Test Method:

The test item was mixed into good quality compost comprising predominantly plant wastes and maintained at a temperature range of 58°±2° C. for up to 6 months. Besides the "volatile organic carbon" derived from the compostal substrate, the test item were the sole carbon and energy source. The test mixtures were aerated with $CO_2$-free compressed air at an aeration rate of 8 to 10 l/h. When the test material was mineralized it was converted to $CO_2$ which was trapped by 3M NaOH in a system of gas-washing bottles. The $CO_2$ was quantified by TIC analysis performed by aid of a carbon analyzer performed at regular intervals. Comparing the amount of $CO_2$ produced upon degradation of the test material with the theoretical amount of $CO_2$ ($ThCO_2$) the percentage of degradation was calculated. Three blank controls with inoculum but without any test item were run in parallel in order to determine the amount of $CO_2$ derived from the compost. The mean of these values was subtracted from those values determined for the test mixtures with the test item (three parallels, too). The control item, Avicel (microcrystalline cellulose), was tested in parallel (with three test mixtures, as well). This control should have been mineralized at an extent of 70% within 6 weeks (42d). At the end of the test, after six months, that item should have been degraded at an extent of >90%. All test mixtures were shaken weekly in order to mix all components in the test vessels, as requested by the guideline ISO 14855. Condensed water in the empty gas washing bottles following the test vessel with the test mixtures was recycled weekly into the respective test vessels in order to keep the moisture content at the desired value.

An important subject of the test was the determination of the disintegration, or physical falling apart into very small fragments, of the test item. For this purpose, some part of the test item was poured into an inert nylon gauze in order to remove that part of the test item intermittently from the test mixture and to investigate if the remaining test item passed through a 2 mm mesh sieve. The test item was considered compostable if not more that 10% of the original test item fails to pass through a >2 mm fraction sieve after 6 weeks of incubation.

After completion of the test, the resulting compost was checked for negative effects on plants according to "Methodenhandbuch zur Analyse von Kompost," Bundesgütegemeinschaft Kompost e. V., March 1994 and to OECD 208 (only test organisms). For this purpose, the resulting compost (blank control and test mixtures with the test item) was diluted 1:4 (25%) and 1:2 (50%) with a standard substrate mixture which was made up with mineral nutrients. As a control, the standard substrate mixture was tested alone. The treatments were transferred loosely into clean plastic pots with a volume of ≈40 mL. Each mixture was prepared in triplicate, and to each replicate, 30 seeds of summer-barley or 10 seeds of mustard were added. The treatments were incubated under defined conditions at approximately 20° C. with a day-night rhythm of 16/8 and wetted daily with tap water. Ten days after 50% of the seeds have emerged, the resulting plants were harvested. The results of weight determinations were set into relation to the non-affected controls and expressed on basis of the individual plants.

Evaluation:

$$\% \text{ Degradation} = \frac{g \text{ } CO_2 \text{ produced} \times 100}{(g \text{ Test item in the solution}) \times (TCO_2)}$$

$TCO_2$=theoretical amount of $CO_2$ which may be developed from the test item expressed as mg $CO_2$/g test item. This value is calculated from the carbon content of the test item and the relation of molar masses of $CO_2$ (=44.01) and carbon (=12.01).

The carbon content of the test item (calculated from total organic carbon (TOC) measurement) was 555.0 mg C/g test item. The molar mass of $CO_2$:C was 44.01:12.01, or 3.667. The theoretical $CO_2$ content of the test item was 2033.8 mg $CO_2$/g test item. Three mixtures comprising approximately 50.0 g test item/300 g compost dry mass ($ThCO_2$ equals approximately 101.7 g $CO_2$/test mixture) were prepared. The test mixtures had an approximate volume of 3 L.

The carbon content of the control item, Avicel, was 422.0 mg C/g control item. The molar mass of $CO_2$:C for the control was 44.01:12.01, or 3.667. Three mixtures comprising approximately 50.0 g control item/300 g compost dry mass ($ThCO_2$ equals approximately 77.3 g $CO_2$/control mixture) were prepared. The control mixtures had an approximate volume of 3 L. Three blank controls were also prepared which comprised 300 g compost dry mass. The results of the degradation test are given in Table 1.

TABLE 1

| | Test Item (mean of 3 parallels) | | | Control Item (mean of 3 parallels) | | |
|---|---|---|---|---|---|---|
| Time (d) | mg $CO_2$ net | mg $CO_2$ net cumulative | Degradation (%) | mg $CO_2$ net | mg $CO_2$ net cumulative | Degradation (%) |
| 0 | 0 | 0 | 0 | 0 | 0 | 0 |
| 7 | 9936 | 9936 | 10 | 41349 | 41349 | 53 |
| 17 | 8423 | 18359 | 18 | 6325 | 47374 | 62 |
| 32 | 9901 | 28260 | 28 | 6681 | 54355 | 70 |

TABLE 1-continued

| | Test Item (mean of 3 parallels) | | | Control Item (mean of 3 parallels) | | |
|---|---|---|---|---|---|---|
| Time (d) | mg $CO_2$ net | mg $CO_2$ net cumulative | Degradation (%) | mg $CO_2$ net | mg $CO_2$ net cumulative | Degradation (%) |
| 47 | 5706 | 33966 | 33 | 3802 | 58157 | 75 |
| 67 | 5601 | 39567 | 39 | 7987 | 66144 | 86 |
| 82 | 5612 | 45178 | 44 | 1504 | 67648 | 87 |
| 98 | 8894 | 54073 | 53 | 4797 | 72445 | 94 |
| 109 | 4089 | 58162 | 57 | 1257 | 73702 | 95 |
| 125 | 3858 | 62020 | 61 | | | |
| 138 | 1816 | 63836 | 63 | | | |
| 160 | 3375 | 67212 | 66 | | | |
| 175 | 449 | 67661 | 67 | | | |
| 180 | 1260 | 68921 | 68 | | | |

There was a mean degradation value of 68% within 180 days for the test item. Therefore, the test item is considered compostable according to DIN EN 13432 and ISO 14855. After six weeks, the disintegration for the test material was not complete meaning that the specimens visually were more or less physically intact. The percent degradation was yet very high, and holes were visible in the specimens. The specimens were also completely covered with white molds indicating the test item was in the degradation process. However, the disintegration test was continued for the full 180 days. By that time, the percent degradation was >90%.

Results of the plant toxicity test are shown in Table 2.

TABLE 2

| | Composition of mixture | Mean Values Mass/Plant (g) | % Inhibition[1] | % Inhibition[2] |
|---|---|---|---|---|
| Mustard | | | | |
| Biomass in the control (Peat) | — | 0.863 | — | — |
| Biomass of the treatment with test item | 25% mixture | 0.532 | 38.4 | -19.3* |
| | 50% mixture | 0.543 | 37.1 | -129.1 |
| Biomass of blank treatment | 25% mixture | 0.446 | 48.3 | — |
| | 50% mixture | 0.237 | 72.5 | — |
| Summer-Barley | | | | |
| Biomass in the control (Peat) | — | 0.511 | — | — |
| Biomass of the treatment with test item | 25% mixture | 0.575 | -12.5 | -13.9* |
| | 50% mixture | 0.543 | -6.3 | -23.7* |
| Biomass of blank treatment | 25% mixture | 0.505 | 1.2 | |
| | 50% mixture | 0.439 | 14.4 | |

[1]With respect to the peat control.
[2]With respect to the blank treatment of the degradation test.
*In comparison with the blank treatment of the degradation test there is an activation.

The compost from the degradation test exhibited an activation, or fertilizer, effect to plant growth. Negative effects due to the test item were not observed.

Various physical properties of the test material were measured. These results are given in Table 3.

TABLE 3

| Physical Property | Test method | Value |
|---|---|---|
| Specific Gravity | ISO 1183-1 | 1.23 |
| Hardness | ISO 868 | 74 (Shore A) |
| Tensile Strength (Ultimate) | ISO 37 | 9.4 MPa |
| Elastic Modulus | ISO 37 | 4.4 MPa |
| Elongation at Break | ISO 37 | >600% |
| Tear Strength | ISO 34-1 | 57 N/mm |

TABLE 3-continued

| Physical Property | Test method | Value |
|---|---|---|
| Melt Flow Index (MFI) @ 190° C./5 kg | ISO 1133 | 99.7 g/10 min |
| Compression Set, 22 hrs @ 23° C. | ISO 815 or ASTM D395 (B) | 33% |
| Compression Set, 22 hrs @ 70° C. | ISO 815 or ASTM D395 (B) | 82% |

Example 2

The following is an exemplary polymeric resin material made in accordance with the present invention:
    40% starch resin (Novamont Mater BI)
    29.25% citric acid-based plasticizer (Citrofol)
    29.25% polyester-based thermoplastic polyurethane (non-premixed TPU) (Ellastolan varieties, BASF)
    1.5% protein (albumin).
The components are mixed together to form a melt, in a device such as an extruder, and then formed into pellets.

Example 3

The following are exemplary polymeric resin materials made in accordance with the present invention. The resin materials are formulated using a master batch mixture of TPU and plasticizer. The master batch utilized comprised a mixture of 82% by weight Ellastolan S85A55N from BASF and 18% by weight citric acid-based plasticizer, Citrofol BII. The master batch was then formulated into finished resin products whose physical characteristics were measured.

TABLE 4

| Component (weight %) | #1 | #2 | #3 | #4 | #5 |
|---|---|---|---|---|---|
| Master batch | 58.5 | 58.5 | 56.5 | 53.5 | 53.5 |
| Novamont Mater Bi (starch component) | 40 | 40 | 40 | 40 | 40 |
| Albumin | 1.5 | 1.5 | 1.5 | 1.5 | 1.5 |
| Citrofol BII (plasticizer) | — | — | 2.0 | 5.0 | 5.0 |
| Physical property | | | | | |
| Hardness (ISO 868), Shore A | 89.4 | 86.4 | 85 | 85.2 | 83.6 |
| Tensile strength (ISO 37), MPa | 9.88 | 13.5 | 13 | 6.04 | 12.2 |
| Elastic modulus (ISO 37), MPa | 20.6 | 18.1 | 16.9 | 14.1 | 14.7 |
| Elongation at break (ISO 37) | >600 | >600 | >600 | >500 | >600 |

Example 4

The following are exemplary polymeric resin materials made in accordance with the present invention. The resin materials are formulated using a master batch mixture of TPU and plasticizer. The master batch utilized comprised a mixture of 82% by weight Ellastolan SP9324 from BASF and 18% by weight citric acid-based plasticizer, Citrofol BII. The master batch was then formulated into finished resin products whose physical characteristics were measured.

TABLE 5

| Component (weight %) | #6 | #7 | #8 | #9 | #10 |
|---|---|---|---|---|---|
| Master batch | 58.5 | 58.5 | 56.5 | 53.5 | 53.5 |
| Novamont Mater Bi (starch component) | 40 | 40 | 40 | 40 | 40 |
| Albumin | 1.5 | 1.5 | 1.5 | 1.5 | 1.5 |
| Citrolfol BII (plasticizer) | — | — | 2.0 | 5.0 | 5.0 |
| Physical property | | | | | |
| Hardness (ISO 868), Shore A | 78.3 | 75.8 | 73.2 | 74.9 | 71.8 |
| Tensile strength (ISO 37), MPa | 9.84 | 11.4 | 11.4 | 8.1 | 11.2 |
| Elastic modulus (ISO 37), MPa | 8.29 | 8.1 | 7.4 | 5.88 | 6.7 |
| Elongation at break (ISO 37) | >600 | >600 | >600 | >600 | >600 |

We claim:

1. A polymeric resin material comprising:
   a starch component;
   a plasticizer;
   a thermoplastic polyester-based resin comprising one or more members selected from the group consisting of polyester polyurethane resins, polyester polyamide resins, and polyether polyester resins; and
   albumin.

2. The polymeric resin material of claim 1, said starch component including one or more polymeric complexing agents.

3. The polymeric resin material of claim 1, said starch component being present in said polymeric resin material at a level of between about 20% to about 60% by weight.

4. The polymeric resin material of claim 1, said plasticizer comprising an organic acid or organic acid ester plasticizer.

5. The polymeric resin material of claim 4, said organic acid ester plasticizer being a citric acid ester plasticizer.

6. The polymeric resin material of claim 1, said plasticizer being present in said polymeric resin material at a level of between about 20% to about 40% by weight.

7. The polymeric resin material of claim 1, said albumin being present in said polymeric resin material at a level of between 0.1% to 3% by weight.

8. The polymeric resin material of claim 1, said thermoplastic polyester-based resin being present in said polymeric resin material at a level of between about 20% to about 40% by weight.

9. The polymeric resin material of claim 1, said albumin being present in said polymeric resin material at a level of between about 0.1% to about 10% by weight.

10. The polymeric resin material of claim 1, said polymeric resin material biodegrading by at least 50% after 100 days of testing in accordance with DIN EN 13432 and ISO 14855.

11. The polymeric resin material of claim 1, said polymeric resin material biodegrading by at least 60% after 120 days of testing in accordance with DIN EN 13432 and ISO 14855.

12. The polymeric resin material of claim 1, said polymeric resin material having an ultimate tensile strength of between about 5 to about 20 MPa when tested in accordance with ISO 37.

13. The polymeric resin material of claim 1, said polymeric resin material exhibiting an elongation at break of at least 600% when tested in accordance with ISO 37.

14. The polymeric resin material of claim 1, said polymeric resin material exhibiting an elastic modulus of between about 1 to about 20 MPa when tested in accordance with ISO 37.

15. The polymeric resin material of claim 1, wherein said polymeric resin material is substantially free of polyolefins.

16. A molded article comprising the polymeric resin material of claim 1.

17. A film comprising the polymeric resin material of claim 1.

18. A biodegradable resin material comprising:
   between about 20% to about 60% by weight of a starch component;
   an organic acid ester plasticizer;
   a thermoplastic polyester-based resin comprising one or more members selected from the group consisting of polyester polyurethane resins, polyester polyamide resins, and polyether polyester resins;
   between about 0.1% to about 10% by weight of albumin,
   said resin material biodegrading by at least 50% after 100 days of testing in accordance with DIN EN 13432 and ISO 14855.

19. The biodegradable resin material of claim 18, said albumin being present in said biodegradable resin material at a level of between 0.1% to 3% by weight.

20. A method of forming a molded article comprising heating a quantity of the polymeric resin material of claim 1 to a temperature of between about 250° F. to about 330° F. thereby producing a polymeric resin melt, and injecting said polymeric resin melt into a mold.

21. The method of claim 20, said heating step being performed using an extruder.

22. A method of forming a film comprising heating a quantity of the polymeric resin material of claim 1 to a temperature of between about 250° F. to about 330° F. thereby producing a polymeric resin melt, and extruding said polymeric resin melt into a film.

* * * * *